(12) United States Patent
Yoshihara et al.

(10) Patent No.: US 6,747,329 B2
(45) Date of Patent: Jun. 8, 2004

(54) SEMICONDUCTOR SENSOR CHIP HAVING DIAPHRAGM AND METHOD OF MANUFACTURING THE SAME

(75) Inventors: Shinji Yoshihara, Nagoya (JP); Yasutoshi Suzuki, Okazaki (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/977,681

(22) Filed: Oct. 16, 2001

(65) Prior Publication Data

US 2002/0079549 A1 Jun. 27, 2002

(30) Foreign Application Priority Data

Dec. 22, 2000 (JP) ......................... 2000-390855

(51) Int. Cl.[7] .............................................. H01L 29/84
(52) U.S. Cl. ........................................................ 257/419
(58) Field of Search ................................. 257/415–420

(56) References Cited

U.S. PATENT DOCUMENTS

| | | | |
|---|---|---|---|
| 3,893,228 A | * 7/1975 | George et al. ................. | 29/580 |
| 5,360,521 A | 11/1994 | Davis et al. | |
| 5,525,549 A | 6/1996 | Fukada et al. | |
| 6,218,717 B1 | * 4/2001 | Toyoda et al. ............... | 257/419 |
| 6,284,670 B1 | * 9/2001 | Abe et al. .................... | 438/745 |

FOREIGN PATENT DOCUMENTS

| | | | | |
|---|---|---|---|---|
| JP | 63-65679 | * | 3/1988 | ........... H01L/29/84 |
| JP | 10-70094 | * | 3/1998 | ......... H01L/21/301 |
| JP | A-10-335305 | | 12/1998 | |
| JP | 11-354816 | * | 12/1999 | ........... H01L/29/84 |

OTHER PUBLICATIONS

U.S. patent application Ser. No. 09/120,803, Abe et al., filed Jul. 23, 1998.

* cited by examiner

Primary Examiner—Bradley Baumeister
(74) Attorney, Agent, or Firm—Posz & Bethards, PLC

(57) ABSTRACT

A plurality of sensor chips, each having strain gauges and a thin diaphragm, are formed on a semiconductor wafer having an upper layer and a lower layer forming a P-N junction plane therebetween. The sensor chips are separated into individual pieces by dicing along column and row interstices dividing the sensor chips. Conductor lines for supplying an electrical voltage for electrochemically etching the diaphragms are formed on and along the interstices. All of the conductor lines are removed by a dicing blade having a wider width than the conductor lines to avoid electrical leakage due to particles of conductor lines leftover on side surfaces of the diced out sensor chips.

4 Claims, 4 Drawing Sheets

SEMICONDUCTOR SENSOR CHIP HAVING DIAPHRAGM AND METHOD OF MANUFACTURING THE SAME

CROSS-REFERENCE TO RELATED APPLICATION

This application is based upon and claims benefit of priority of Japanese Patent Application No. 2000-390855 filed on Dec. 22, 2000, the content of which is incorporated herein by reference.

BACKGROUND OF THE INVENTION

1. Field of the Invention

The present invention relates to a semiconductor sensor chip having a diaphragm for detecting pressure, acceleration or the like, the semiconductor chip being separated from a semiconductor wafer by dicing.

2. Description of Related Art

It is generally known to form a thin diaphragm for detecting a pressure on a semiconductor sensor chip by making a cavity under an anisotropic etching process. There is a problem, however, that sharp corners are formed at bottom portions of the cavity if the cavity is etched out by the anisotropic etching. Since a stress is concentrated at the sharp corners, a mechanical strength of the thin diaphragm is reduced. JP-A-11-97413 proposes a method for rounding the sharp corners of the cavity by additionally performing electrochemical isotropic etching after the cavity is formed by the anisotropic etching process, thereby to reduce the stress imposed on sharp corners and to improve the mechanical strength of the diaphragm.

Conductor lines have to be formed along column and row dicing lines on the semiconductor wafer to apply a voltage for the electrochemical isotropic etching. In the conventional method, however, it is highly possible that a part of a conductor material forming the conductor lines remains on individual chips after the sensor chip is separated by dicing. If the conductor remains on the semiconductor sensor chip, particles of the conductor adhere to diced-out sides of the sensor chip, and thereby a current leakage occurs on the side surfaces thereof. To prevent the leakage, it is proposed to use a protective diode connected between a sensor circuit and the conductor lines. However, the chip size has to be larger if such a diode is additionally used.

SUMMARY OF THE INVENTION

The present invention has been made in view of the above-mentioned problem, and an object of the present invention is to provide an improved semiconductor sensor chip having a diaphragm, in which current leakage is prevented without using a protecting diode. Another object of the present invention is to provide a method of manufacturing such an improved semiconductor sensor chip.

A semiconductor wafer having an upper layer and a lower layer, both layers forming a P-N junction plane therebetween, is prepared. A plurality of sensor elements including strain gauges are formed on the upper layer of the wafer. Each sensor element is separated from one another by interstices running in column and row directions on the wafer. An impurity is diffused in the upper layer to form first diffused layer positioned along the interstices, and further the same impurity is diffused along the P-N junction plane to form second diffused layer positioned underneath the first diffused layers. The impurity density in the first and the second diffused layers is made higher than that of the semiconductor wafer.

Then, conductor lines are formed on the upper layer to cover the first diffused layers. Portions of the lower layer are etched to form diaphragms, each positioned underneath each sensor element. The diaphragms are formed by first performing anisotropic etching and then performing isotropic etching by applying an electrical voltage to the lower layer through the conductor lines and the first and second diffused layers. Corners of cavities formed by the anisotropic etching are rounded by the isotropic etching, thereby to enhance mechanical strength of the diaphragms.

Then, the semiconductor wafer is diced with a dicing blade along the conductor lines formed in the interstices to separate individual sensor chips. A width of the dicing blade is made wider than a width of the conductor lines, so that all of the conductor lines are removed by dicing. Preferably, a width of the first diffused layers formed underneath the conductor lines is made narrower than the width of the conductor lines to ensure all of the first diffused layers are removed by dicing when the conductor lines are all removed. Further, a width of the second diffused layers is made wider than that of the first diffused layers, so that the second diffused layers expose to sides of the semiconductor chips after they are diced out.

Since the conductor lines and the first diffused layers are all removed by dicing, electrical leakage due to leftover particles is surely avoided. Further, the electrical voltage for the isotropic etching is effectively applied to the lower layer through the second diffused layers which are made wider than the first diffused layers. The second diffused layers exposed to the side surfaces of the sensor chip effectively separate the upper layer and the lower layer.

Other objects and features of the present invention will become more readily apparent from a better understanding of the preferred embodiment described below with reference to the following drawings.

DETAILED DESCRIPTION OF THE PREFERRED EMBODIMENT

Figure 1:
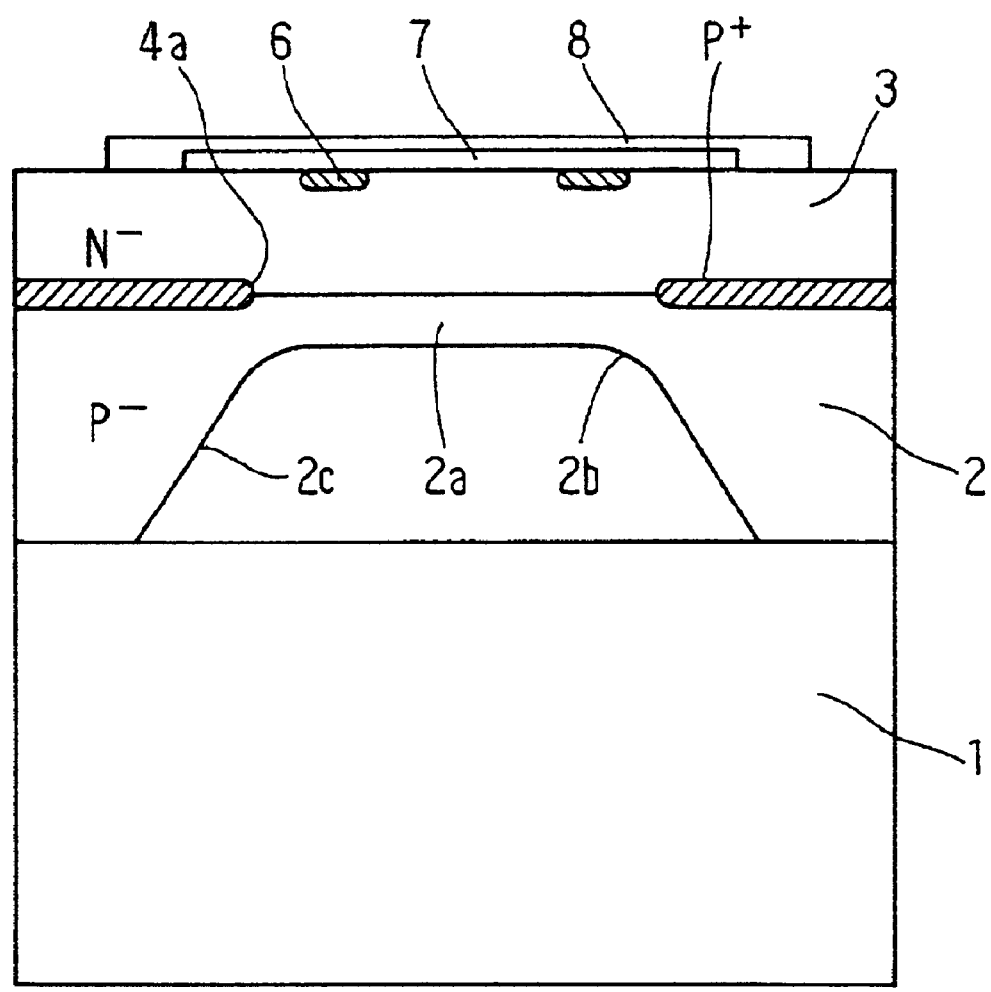
FIG. 1 is a cross-sectional view showing a semiconductor sensor chip diced out from a semiconductor wafer.

A preferred embodiment of the present invention will be described with reference to accompanying drawings. FIG. 1 shows a semiconductor sensor chip diced out from a wafer that includes a plural sensor chips formed thereon. This sensor chip is used for detecting a pressure such as a fuel pressure in an automotive vehicle.

A substrate of the sensor chip (a semiconductor wafer on which plural sensor chips are formed) is composed of a P⁻ type silicon substrate 2 and an N⁻ type epitaxial layer 3 formed the substrate 2. The sensor chip is bonded to a glass substrate 1. The P⁻ type silicon substrate 2 is etched from its rear surface forming a cavity 2c and a thin diaphragm 2a. Upper corners 2b of the cavity 2c are rounded by isotropic electrochemical etching. P⁺ type high density diffused layers 4a are formed between the substrate and the epitaxial layer 3. Strain gauges 6 are formed on the front surface of the N⁻ epitaxial layer 3 and covered with a silicon oxide film 7. The silicon oxide film 7 is further covered with a silicon nitride film 8. Wires (not shown) connecting strain gauges 6 are also formed on the front surface of the N⁻ type epitaxial layer 3.

A manufacturing process of the sensor chip will be described with reference to FIGS. 2A–2E. A plurality of sensor chips are formed on the semiconductor wafer, each separated from one another by column and row interstices 9. Individual sensor chips are cut out form the wafer by dicing along the interstices 9.

Figure 2A:
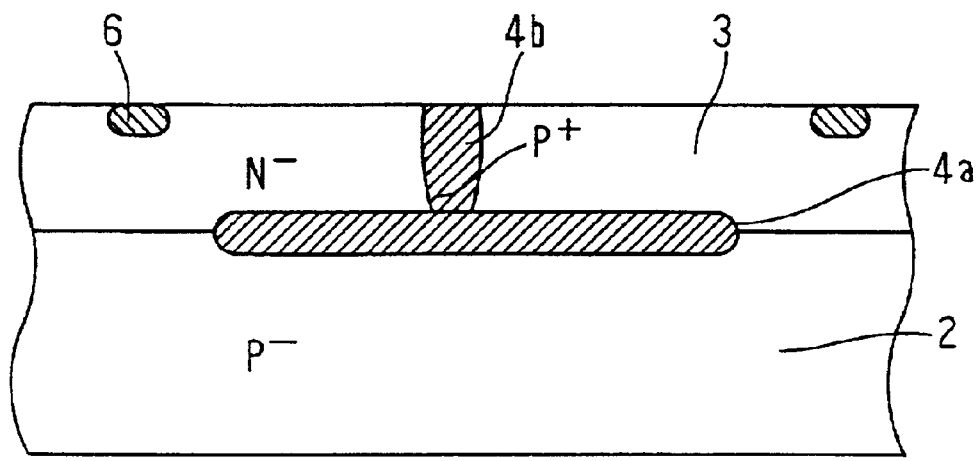
FIGS. 2A –2D are cross-sectional views showing a sequence of a manufacturing process of the sensor chip according to the present invention, each showing a portion of a semiconductor wafer including an interstice along which individual sensor chips are separated by dicing.

As shown in FIG. 2A, the P⁺ type high density diffused layer 4a is first formed on the front surface of the P⁻ type silicon substrate 2, and then the N⁻ type epitaxial layer 3 is formed thereon. Then, the strain gauges 6 and P⁺ type high density diffused contact 4b are formed on the front surface of the epitaxial layer 3 under known processes including oxidized film formation, photo-etching, ion-implantation, diffusion and so on. The P⁺ type high density diffused contact 4b is used as a contact for giving a potential to the silicon substrate 2. The P⁺ type high density diffused contact 4b is formed to contact the P⁺ type high density diffused layer 4a. Other high density diffused layers (not shown) for insulating circuit elements are also formed at the same time.

Figure 2B:
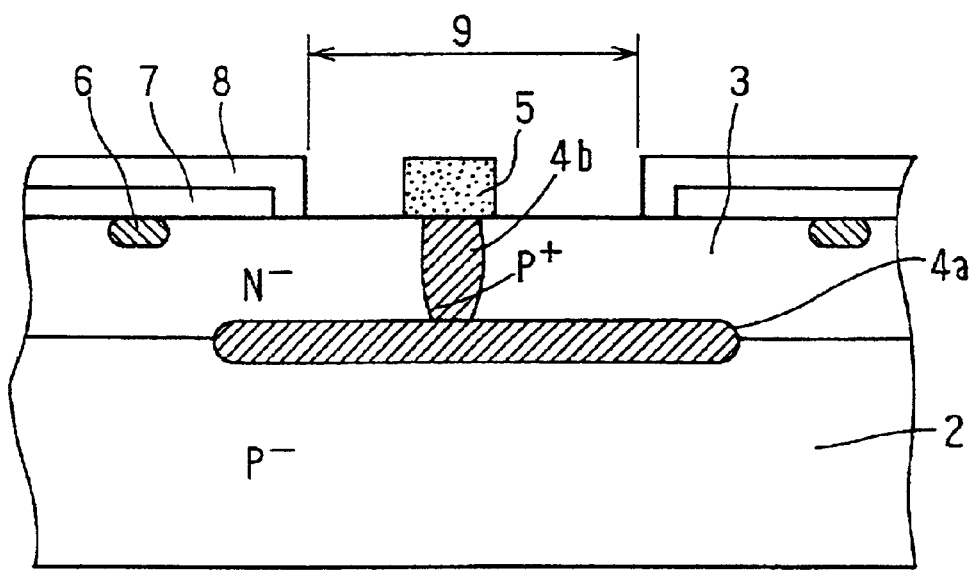

As shown in FIG. 2B, a conductor line 5 is formed on the front surface of the N⁻ type epitaxial layer 3 at a position covering the P⁺ type high density diffused contact 4b. The conductor line 5 is formed in the same process forming wirings of the sensor circuit. The conductor line 5 is used for supplying voltage to the substrate 2 for isotropically etching the cavity 2c (explained later). The conductor line 5 and the N⁻ type epitaxial layer 3 are connected to each other by Schottky contact. Then, the silicon oxide film 7 and the silicon nitride film 8 are formed by patterning to cover the strain gauges 6 and associated circuits. The interstices 9 which run in the column and row directions on the wafer surface are provided to separate the sensor chips.

Figure 2C:
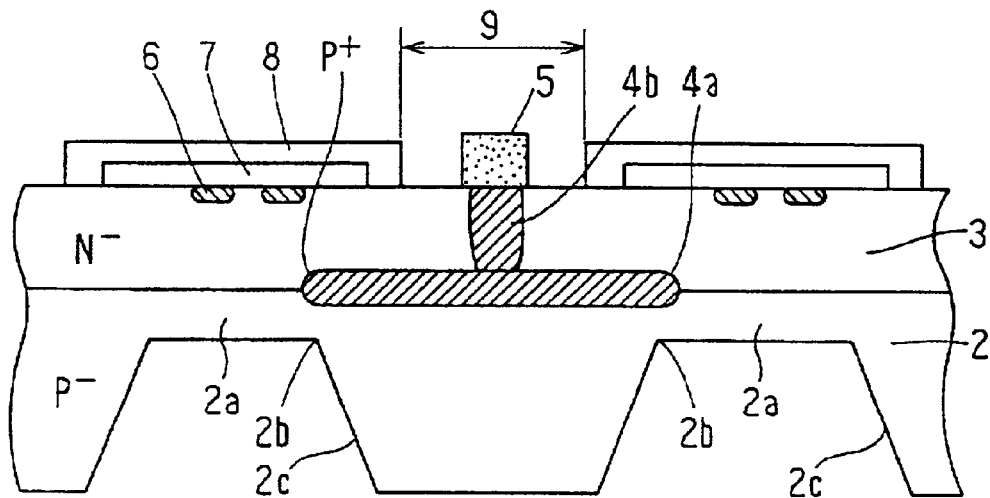
Figure 2D:
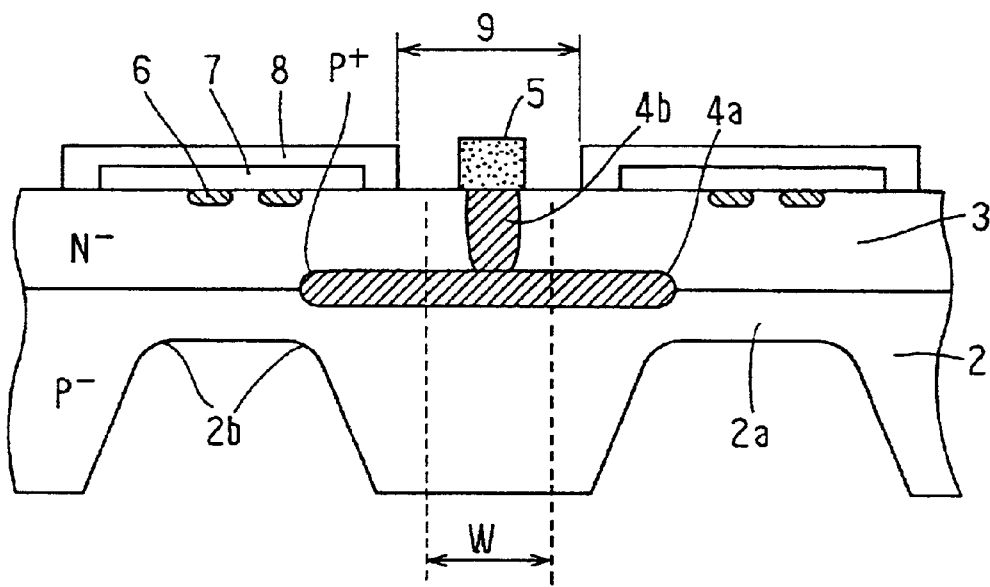

Then, as shown in FIG. 2C, the P⁻ type silicon substrate 2 is anisotropically etched using an aqueous solution such as KOH from the rear surface thereof. Portions of the substrate 2 are removed by the anisotropic etching, thereby forming the cavity 2c and the diaphragm 2a. Then, a voltage is supplied to the substrate 2 from the conductor line 5 through the P⁺ type high density diffused contact 4b and the P⁺ type high density diffused layer 4a. The voltage is supplied while dipping the substrate 2 in the aqueous solution such as KOH. By supplying the voltage, an anode-oxidized film covering the surface of the cavity 2c is formed, and sharp corners 2b formed at bottom corners of the cavity 2c are rounded, as shown in FIG. 2D, by isotropically etching the anode-oxidized film. By rounding the cavity corners 2b, the mechanical strength of the diaphragm 2a are sufficiently improved. The process of rounding the cavity corners 2b is carried out in the same manner as described in JP-A-11-97413 which is referred to in the background section above.

Figure 2E:
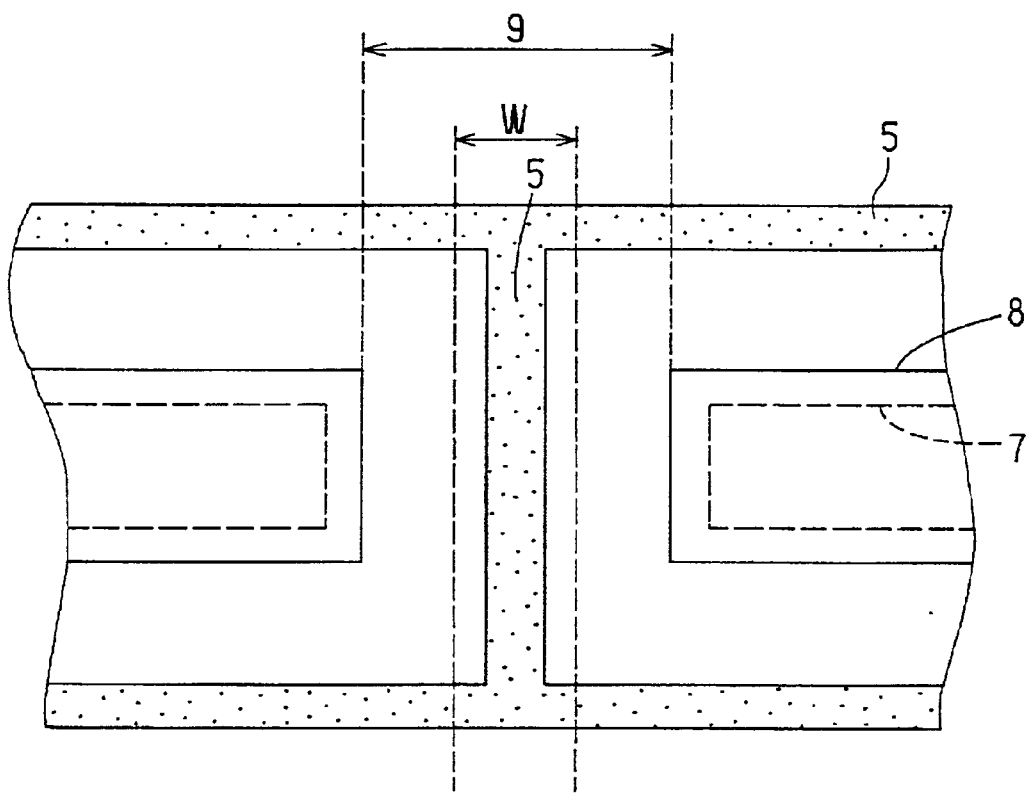
FIG. 2E is a plan view showing a part of the wafer surface on which conductor lines are formed.

Then, the glass substrate 1 is bonded to the rear surface of the substrate 2, as shown in FIG. 1. Then, the wafer is diced with a dicing blade along the conductor lines 5 formed in the interstices 9. Thus, the wafer is separated into individual sensor chips. The width of the dicing blade W is wider than the width of the conductor line 5 and narrower than the width of the interstice 9, as shown in FIGS. 2D and 2E.

Since the width of the dicing blade W is wider than the width of the conductor line 5, the conductor line 5 is entirely removed by the dicing process without leaving any part thereof. Therefore, particles of the conductor line 5 do not adhere to the diced-out side surface of the sensor chip. Thus, the current leakage due to the remaining conductor particles which occurred in the conventional process is eliminated in the process according to the present invention. Accordingly, it is not necessary to use a protective diode for preventing the leakage.

The width of the P⁺ type high density diffused contact 4b is made smaller than the width of the conductor line 5. Therefore, the contact 4b is entirely removed in the course of the dicing process, and the leakage due to the particles of contact 4b is also avoided. Further, it is guaranteed that the P⁺ type high density diffused contact 4b is entirely removed if it is confirmed that the conductor line 5 is removed by inspecting the sensor chip from outside.

The width of the P⁺ type high density diffused layer 4a is made much wider than the width of the P⁺ high density diffused contact 4b, as shown in FIGS. 2A–2D. Therefore, the voltage for the isotropic etching is effectively applied to the silicon substrate 2 through the wide layer 4a. Further, the layer 4a exposes to the side surfaces of, the sensor chip at a position where the P⁻ substrate 2 and the N⁻ epitaxial layer 3 contact each other, when the sensor chip is cutout by dicing. Therefore, a leakage current between the P-N junction is prevented by the layer 4a.

The present invention is not limited to the embodiment described above, but it is applicable to other sensors. For example, it can be similarly applied to semiconductor dynamic sensors such as an acceleration sensor. Though the silicon substrate having a P-N junction is used in the embodiment described above, other semiconductor substrates may be used.

While the present invention has been shown and described with reference to the foregoing preferred embodiment, it will be apparent to those skilled in the art that changes in form and detail may be made therein without departing from the scope of the invention as defined in the appended claims.

What is claimed is:

1. A semiconductor sensor chip comprising:

a semiconductor substrate having a front portion and a rear portion, the front portion and the rear portion having a different conductivity to form a P-N junction plane parallel to front and rear surfaces of the semiconductor substrate;

a sensing element disposed in the front portion at a vicinity of the front surface of the semiconductor substrate;

a diaphragm contoured by a cavity extending from the rear surface into the rear portion of the semiconductor substrate; and a diffused layer disposed on and along the P-N junction plane and exposed to a side surface of the semiconductor sensor chip, the diffused layer having a same conductivity type as the rear portion where the cavity is located and having an impurity density higher than an impurity density of the rear portion of the semiconductor substrate, wherein the diffused layer has a pattern for permitting the front and rear portions to directly contact each other at a position below the diaphragm, and wherein the diffused layer is a buried layer not exposed at the front surface of the front portion.

2. The semiconductor sensor chip as in claim 1, wherein:

the semiconductor sensor chip has a rectangular plane shape; and the diffused layer is exposed to four sides of the sensor chip.

3. A semiconductor sensor chip comprising:

a semiconductor substrate having a front portion and a rear portion, the front portion and the rear portion having a different conductivity to form a P-N junction plane parallel to front and rear surfaces of the semiconductor substrate;

a sensing element disposed in the front portion at a vicinity of the front surface of the semiconductor substrate;

a diaphragm contoured by a cavity extending from the rear surface into the rear portion of the semiconductor substrate; and a diffused layer disposed on and along the P-N junction plane and exposed to a side surface of the semiconductor sensor chip, the diffused layer having a same conductivity type as the rear portion where the cavity is located and having an impurity density higher than an impurity density of the rear portion of the semiconductor substrate, wherein corners of the cavity are rounded, and wherein the diffused layer is a buried layer not exposed at the front surface of the front portion.

4. The semiconductor sensor chip as in claim 3, wherein the diffused layer is for preventing P-N junction plane leakage current.

* * * * *